(12) United States Patent
Gitt

(10) Patent No.: US 7,225,696 B2
(45) Date of Patent: Jun. 5, 2007

(54) DOUBLE CLUTCH TRANSMISSION

(75) Inventor: Carsten Gitt, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 141 days.

(21) Appl. No.: 11/073,040

(22) Filed: Mar. 4, 2005

(65) Prior Publication Data
US 2005/0193848 A1 Sep. 8, 2005

(30) Foreign Application Priority Data
Mar. 5, 2004 (DE) .................... 10 2004 010 806

(51) Int. Cl.
*F16H 3/38* (2006.01)
(52) U.S. Cl. .................... 74/340; 74/329; 74/330; 74/331; 74/339; 74/359; 74/360
(58) Field of Classification Search .................. 74/329, 74/330, 331, 339, 340, 359, 360
See application file for complete search history.

(56) References Cited

U.S. PATENT DOCUMENTS

| | | | | |
|---|---|---|---|---|
| 2,654,261 A | * | 10/1953 | Youngren et al. ......... 74/336 R |
| 6,209,407 B1 | * | 4/2001 | Heinzel et al. .............. 74/331 |
| 6,250,171 B1 | * | 6/2001 | Sperber et al. .............. 74/331 |
| 6,874,381 B2 | * | 4/2005 | Berger et al. ............... 74/335 |
| 7,066,043 B2 | * | 6/2006 | Kim et al. ................... 74/330 |
| 2003/0121343 A1 | * | 7/2003 | Berger et al. ............... 74/340 |
| 2005/0081661 A1 | * | 4/2005 | Kim ............................ 74/333 |
| 2006/0169078 A1 | * | 8/2006 | Hiraiwa ...................... 74/331 |

FOREIGN PATENT DOCUMENTS

| | | |
|---|---|---|
| DE | 198 21 164 A1 | 11/1999 |
| DE | 198 60 251 C1 | 11/2000 |
| DE | 101 08 881 A1 | 9/2002 |
| DE | 103 16 070 A1 | 10/2003 |
| GB | 2103316 A * | 2/1983 |

* cited by examiner

*Primary Examiner*—David D. Le
(74) *Attorney, Agent, or Firm*—Klaus J. Bach

(57) ABSTRACT

In a double clutch transmission in which an input shaft can be coupled by two load clutches selectively with a central intermediate shaft and a concentric intermediate shaft and each of the intermediate shafts can be operatively connected by gear stages selectively to a first or a second jackshaft arranged in the power output path to a driven vehicle axle, wherein the jackshafts are arranged parallel to the transmission input and intermediate shafts, the intermediate shafts each have at least one gear firmly mounted thereon which forms the input gear for more than one of the gear stages provided for different transmission gear ratios so as to form a compact transmission arrangement, particularly for transverse engine applications.

22 Claims, 2 Drawing Sheets

DOUBLE CLUTCH TRANSMISSION

BACKGROUND OF THE INVENTION

The invention relates to a double clutch transmission in which an input shaft can be coupled by two load clutches selectively with a central intermediate and a concentric intermediate shaft and each of the intermediate shafts can be operatively connected to a first or a second jackshaft for transferring power at different transmission ratios.

In such double clutch transmissions as disclosed for example in DE 198 21 164 A1, the transmission gear structure engaged for forming the reverse transmission gear setup is connected to the central intermediate shaft and, additionally, forms the transmission gear setup for the first forward gear (I. gear). The known double clutch transmission includes six forward gears of which the transmission structure for the even number gears IV and VI are formed by an engaged gear arrangement and the even number gear II is formed by a simple gear structure and both are connected to the concentric intermediate shaft. Consequently, the central intermediate shaft is associated with two additional simple gear structures for forming the transmission arrangements of the odd numbered gears III and IV, that is, altogether with three transmission gear structures. With this arrangement, it is difficult to accommodate additional gear stages if more than six forward gears are to be provided since then at least one additional odd numbered gear arrangement would have to be provided by an additional gear stage which would have to be connected to the central intermediate shaft that is already connected to three gear stages.

This known double clutch transmission with six forward gears and one reverse gear is to be shifted via a shift arrangement using a central shift rod as it is known from DE 101 08 881 A1.

SUMMARY OF THE INVENTION

In a double clutch transmission in which an input shaft can be coupled by two load clutches selectively with a central intermediate shaft and a concentric intermediate shaft and each of the intermediate shafts can be operatively connected by gear stages selectively to a first or a second jackshaft arranged in the power output path to a driven vehicle axle, wherein the jackshafts are arranged parallel to the transmission input and intermediate shafts, the intermediate shafts each have at least one gear firmly mounted thereon which forms the input gear for more than one of the gear stages provided for different transmission gear ratios so as to form a compact transmission arrangement, particularly for transverse engine applications.

The difficulties for accommodating an additional gear stage for an odd numbered gear pointed out above are overcome with the double clutch transmission according to the invention because the engaged gear stage forming the transmission structure of the reverse gear is associated with the concentric intermediate shaft so that the engaged gear stage associated with the central intermediate shaft can be used for forming the transmission structure for the additional odd numbered gear arrangement.

In the double clutch transmission according to the invention, the engaged gear stage associated with the concentric intermediate shaft is, in an advantageous embodiment, used for forming the transmission structure of the second lowest forward gear (II. Gear).

With the arrangement according to the invention, in addition to the four odd numbered forward gears associated with the central intermediate shaft, three even numbered forward gears may be associated with the concentric intermediate shaft, that is, altogether seven forward gears can be accommodated. The three gear stages associated with the concentric intermediate shaft are advantageously connected to a first and a second jackshaft and two of the even numbered forward gear stages are engageable by a gear engagement clutch disposed on the first jack shaft for the selective engagement of the respective two rotatably supported gears.

In an advantageous embodiment of the double clutch transmission according to the invention, the reverse gear structure can be formed by the utilization of a third jack shaft, wherein the selective engagement of the gear stage for the reverse gear and the gear stage associated with the concentric intermediate shaft is obtained by way of the freely rotatable gear thereof and a gear change arrangement on the second jack shaft is accomplished, which may be arranged in the center of the gear plane of the firmly supported gear structure of the concentric intermediate shaft.

In the double clutch transmission according to the invention, the gear stages connected to the concentric intermediate shaft are arranged in a space-saving order of the respective even numbered gears II→IV→VI arranged in this order in axial direction toward the associated load control clutch K2.

A gear structure connected to the first jackshaft and the third jack shaft can be arranged in a common plane extending normal to the rotational axis, thereby providing for a short transmission arrangement.

Advantageously another gear change is arranged on the first jack shaft whereby two odd-numbered gear stages can selectively be engaged.

In another advantageous embodiment, a further gear change clutch may be arranged on the second jackshaft by way of which two gear structures of the two other odd-numbered gear structures can selectively be engaged.

Preferably, the two gear change clutches of the connected gear stages of the central intermediate shaft are arranged on the first and second jackshaft together with a gear structure of an odd numbered forward gear in a space saving manner.

Advantageously, the four odd numbered forward gears or, respectively, the gear structures thereof are assigned to the central intermediate shaft.

The first and second jackshaft may have axes arranged at different distances from the input shaft wherein the jackshaft of the gear structure used for form the lowest forward gear arrangement is disposed at the greater distance.

The first and the second jackshaft advantageously have different transmission ratios wherein the first jackshaft carrying the output gear of the gear-stage forming the lowest forward gear has the shorter transmission ratio.

The output-side gears of the two gear stages with the lowest and the highest transmission ratios may be arranged on different jackshafts.

Different from the arrangement as described above the transmission may include different gear stages in a common plane normal to the transmission axis, for example, the gear structure including the reversing gear for the reversal of the direction of rotation in reverse disposed between the second and the third jackshaft and the gear structure associated with the central intermediate shaft and the first jackshaft for forming the third gear transmission structure.

In another embodiment of the double clutch transmission according to the invention, the axes of rotation of the first and the second jack shaft are arranged at essentially the same distance from the axis of the input shaft.

Finally the gear stages connected to the central intermediate shaft may be used to provide the transmission structures for a third and a fifth forward gear (III. gear and V. gear).

The double clutch transmission according to the invention provides for a compact design particularly a short length of the transmission which makes the transmission particularly suitable in connection with transverse engine applications.

In the double clutch transmission according to the invention, also the number of components, particularly the number of gears, is relatively small because of multiple uses of individual gears. The arrangement also provides, in an advantageous manner, for a progressive gear gradation.

In order to provide for the two transmission gears formed by a fixed gear stage (that is, gears with a common center gear on the respective center shaft) different transmission ratios various measures (of course also in combination) can be employed.

The jackshaft with the lower of the two respective gears has a shorter transmission ratio than the jackshaft with the other gear.

The jackshaft with the lower of the two respective gears has a larger distance from the axis the input shaft than the jackshaft with the other gear.

The use of an appropriately selected profile shift.

The double clutch transmission according to the invention is not limited with regard to the gradation of the various gears. For example, it is possible to select a progressive or a geometric gradation or any combination thereof (for example, combinations of geometric and progressive gradations can be used).

The invention will be described below on the basis of a particular embodiment shown in the accompanying drawings.

DESCRIPTION OF AN ADVANTAGEOUS EMBODIMENT

Figure 1:
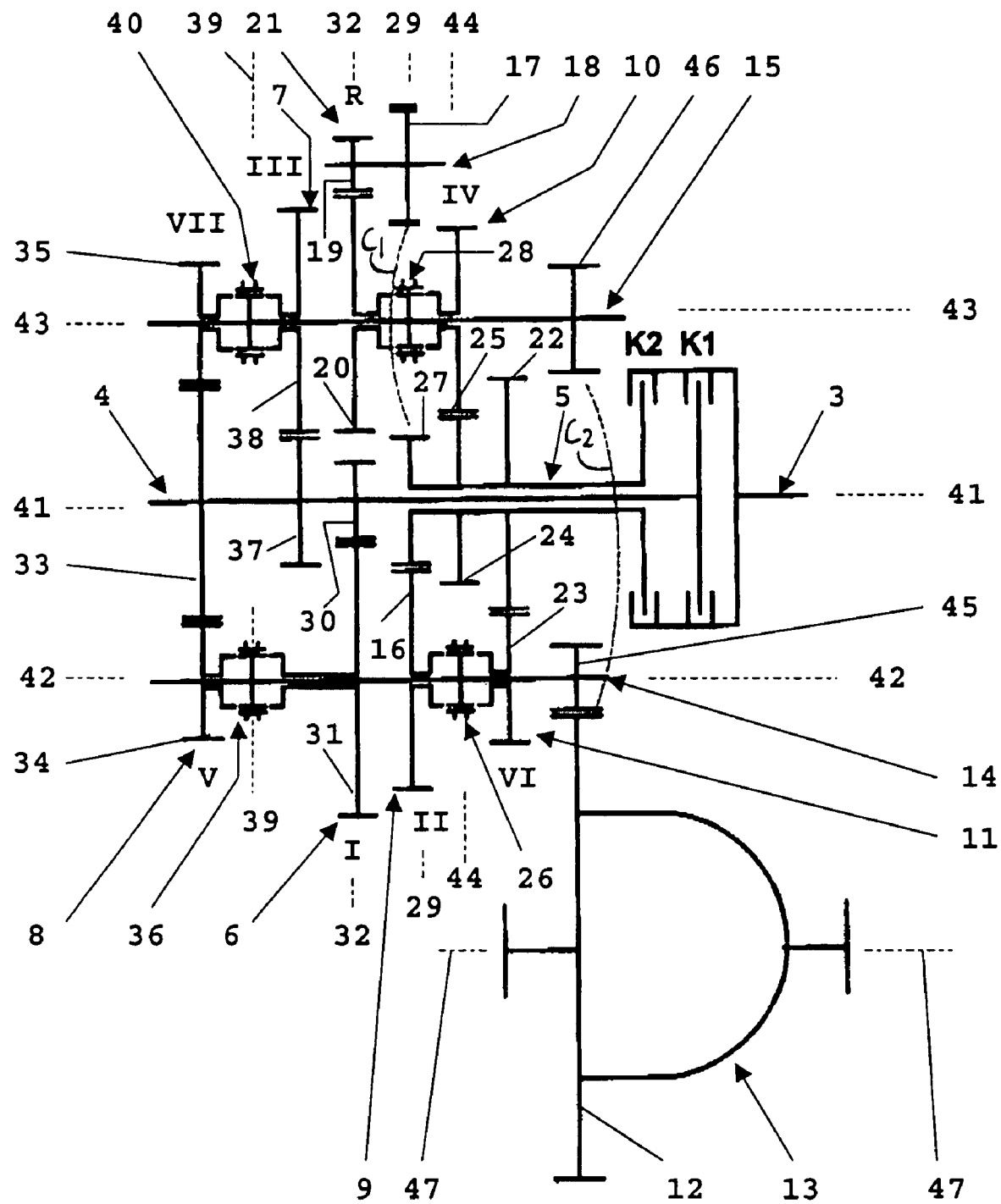
FIG. 1 shows, in principle, a transmission scheme for an embodiment of the double clutch transmission according to the invention in a longitudinal cross-sectional view.

The transmission includes an input shaft 3 which is driven by an engine. The input shaft 3 can be coupled by a first load clutch K1 to an intermediate center shaft 4 and, by a second load clutch K2 to an intermediate shaft 5 which is concentric with the intermediate center shaft 4. Parallel to, and spaced from, the input shaft 3 and also spaced from one another a first jackshaft 14 and a second jackshaft 15 as well as a third jackshaft 18 are arranged. On the first jackshaft 14, a drive gear 45 is firmly mounted for rotation therewith, which is in engagement with a gear ring 12 of a differential wheel drive 13. On the second jackshaft 15, another drive gear 46 is supported for rotation with the second jackshaft 15 which is also in engagement with the gear ring 12 of the differential wheel drive 13.

The central intermediate shaft 14 is provided with a simple gear stage 6 forming the gear structure for the first forward gear, I. gear, whose input gear 30 is firmly mounted on the central intermediate shaft 4 and whose output gear 31 is rotatably supported on the first jackshaft 14.

The central intermediate shaft 4 carries another simple gear stage 7 forming the transmission gear structure for a third forward gear, III. gear, whose input gear 37 is firmly connected to the intermediate shaft 4 and whose output gear 3S is rotatably supported on the second jackshaft 15.

The central intermediate shaft 4 is further provided with a fixed gear stage 8 whose input center gear 33 is firmly mounted on the central intermediate shaft 4 for rotation therewith. A first output gear 34 in engagement with the center gear 33 is rotatably supported on the first jackshaft 14 and is used for forming the gear transmission for a fifth forward gear V. A second output gear 35 of the fixed gear stage 8 which is in engagement with the center gear 33 forms the transmission gear structure for a seventh forward gear VII and is rotatably supported on the second jackshaft 15.

The rotatably supported gears 31 and 34 of the transmission gear stages 6 and 8 can be selectively coupled to the jackshaft 14 for rotation therewith by a gear change clutch 36. The rotatably supported gears 38 and 35 of the transmission gear stages 7 and 8 can be selectively coupled with the jackshaft 15 for rotation therewith by a another gear change clutch 40. The gear change clutches 36 and 40 are arranged centrally in a coupling plane 39—39 extending normal to the jackshafts 14 and 15.

The concentric intermediate shaft 5 is provided with a fixed transmission gear stage 9 whose central input gear 27 is firmly mounted on the intermediate concentric shaft 5. An output gear 16 thereof which is in engagement with the central input gear 27 is used for a gear-structure for the second forward transmission gear II and is rotatably supported on the first jackshaft 14. Another output gear 17 of the fixed transmission gear stage 9, which is also in engagement with the central output gear 27, is used for forming a reverse gear R and is firmly supported on the third jackshaft 18 for rotation therewith. The engagement between the gear 27 and the output gear 17 is indicated in FIG. 1 by a connecting line $C_1$.

The third jackshaft 18 is provided with a simple transmission gear structure 21 whose input gear 19 is firmly supported on the jackshaft 18 for rotation therewith. The output gear of the transmission gear structure 21 is a reversing gear 20 which is rotatably supported on the second jackshaft 15 which is bypassed by the output gear 17.

The transmission gear structures 6 and 21 are disposed in a common plane 32—32 extending normal to the axes of rotation of the transmission.

The concentric intermediate shaft 5 is provided with another simple transmission gear stage 10 which is disposed axially adjacent the fixed transmission gear stage 9 at the side thereof facing the load clutch K2 for forming the transmission gear structure for a fourth gear IV and whose input side gear 24 is fixed on the concentric intermediate shaft 5. The output gear 25 of the gear stage 10 is rotatably supported on the second jackshaft 15.

The output gear 25 of the gear stage 10 and the reversing gear 20 can be selectively coupled with the second jackshaft 15 via a still another gear change clutch 28 which is arranged in the center of the plane 29—29 extending normal to the shafts and through the fixed gear stage 9.

The concentric intermediate shaft 5 is finally provided with an additional simple gear stage 11, which forms a sixth forward gear VI and is arranged axially between the gear stage 10 and the load clutch K2. The input gear 22 of the gear stage 11 is firmly supported on the intermediate concentric shaft 5 for rotation therewith. The output gear 23 of the gear stage 11 is rotatably supported on the first jackshaft 14.

The rotatably supported gears 16 and 23 of the gear stages 9 and 11 can be coupled to the first jackshaft 14 selectively by a fourth gear change clutch 26 which is disposed centrally with respect to the gear plane 44—44 of the gear stage 10, which plane extends normal to the transmission shafts.

Figure 2:
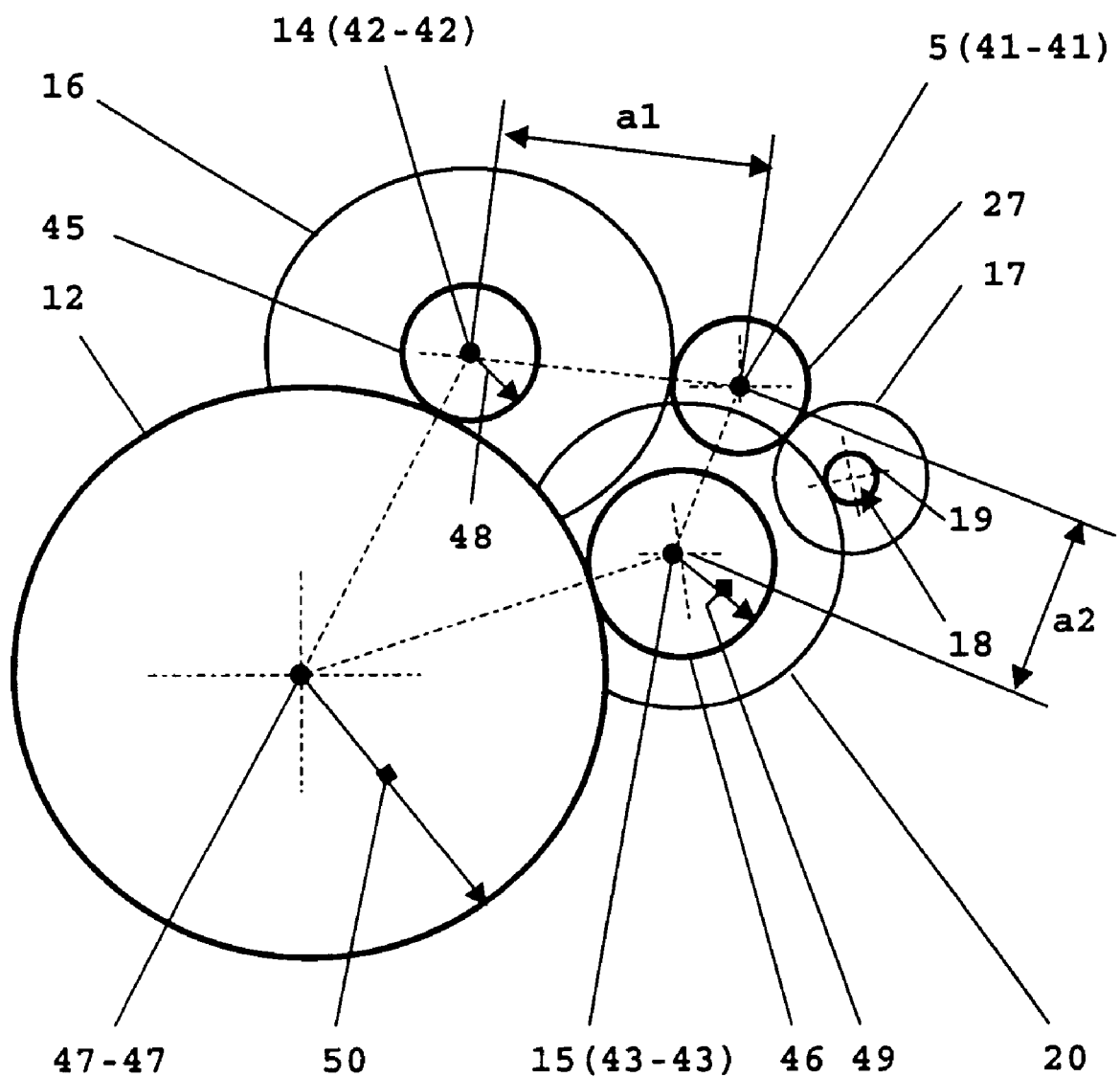
FIG. 2 is a schematic transverse cross-sectional view of the transmission according to FIG. 1 showing the position of the various transmission shafts relative to one another.

As shown in FIG. 2, the axis of rotation 42—42 of the first jackshaft 14 which supports one output gear 34 (V. Gear) of the gear stage 8 is arranged at a distance from the axis of rotation 41—41 of the input shaft 3, which is greater than the distance 2a between the axis of rotation 43—43 of the second jackshaft 15, which supports the other gear 35 (VII gear of the gear stage 8 from the input shaft axis 41—41.

The respective distances of the first and the second jackshafts 14 and 15 from the center axis 47—47 of the drive axle differential 13 (see FIG. 2) also determine the respective transmission ratios.

The transmission output gears 45 and 46 (as indicated by the connecting line C2 in FIG. 1) are both in engagement with the differential axle gear ring 12.

It is apparent from FIG. 2 by the ratios of the radii 48 and 50 of the gears 45 and 12 or, respectively, by the radii 49 and 50 of the gears 46 and 12 that the first jackshaft 14 has a greater transmission ratio with respect to the gear 12 than the jackshaft 15.

Within the limits of the claims the spatial arrangements of the various transmission gear setup (particularly the axial arrangement of the gears) in the double clutch transmission according to the invention may be changed to be different from that shown.

What is claimed is:

1. A double clutch transmission including an input shaft (3), a central intermediate shaft (4) and a concentric intermediate shaft (5) disposed around the central intermediate shaft (4), first and second load clutches (K1 and K2) mounted on the input shaft (3) for selectively engaging the central intermediate shaft (4) and, respectively, the concentric intermediate shaft (5) for rotation with the input shaft (3), first and second jackshafts (14, 15) arranged in spaced parallel relationship from the intermediate shafts (4, 5), each of the intermediate shafts (4, 5) carrying fixed gears and the jackshafts (14, 15) carrying rotatable gears forming gear structures which can be selectively engaged with the jackshafts (14, 15) to provide gear stages for various power transmission ratios, each of the central and the concentric intermediate shafts having one fixed gear (33, 27) each of which is used for forming two gear stages that is, a largest fixed gear (33) of the central intermediate shaft (4) meshes with an end output gear (34) on the first jackshaft (14) and a jackshaft end output gear (35) on the second jackshaft (15), and a smallest fixed gear (27) of the concentric intermediate shaft (5) forming a forward gear structure with a second largest gear (16) on the first jackshaft (14) and one of fixed reversing gears on a third jackshaft (18) for forming a reverse simple transmission gear stage (R), said reverse simple transmission gear stage (R) including a first fixed reversing gear (17) mounted on the third jackshaft (18) and disposed in engagement with, and in the same transmission plane (29) as, the smallest fixed gear (27) of the concentric intermediate shaft (5) and a second fixed reversing gear (19) supported on the third jackshaft (18) and being in engagement with a reversing output gear (20) disposed on the second jackshaft (15) in another gear plane (32), said transmission further including transmission gear structures for first and second forward gears comprising a smallest gear (30) on the intermediate shaft (4) in engagement with a largest rotatable gear (31) on the first jackshaft (14) (first forward gear) and the smallest fixed gear (27) on the concentric intermediate shaft (5) in engagement with the second largest gear (16) on the first jackshaft (14) (second forward gear), the gear structures for the first and second forward gears being in the same gear plane (29,32) as the first fixed reversing gear (17) and respectively, the second fixed reversing gear (19) supported on the third jackshaft (18).

2. The double clutch transmission according to claim 1, wherein the first fixed reversing gear (17) and the second fixed reversing gear (19) disposed on the third jackshaft (18) as well as the gear structures for the first and second forward gears are disposed in adjacent transmission planes (29, 32) for transmitting a reverse torque flow to the second jackshaft (15) and first and second gear torque flows to the first jackshaft (14).

3. The double clutch transmission according to claim 1, wherein the first and second jackshafts (14, 15) are in engagement with an axle drive gear (12) via drive gears (45, 46) of different diameter for providing different transmission ratios.

4. The double clutch transmission according to claim 1, wherein the first and second jackshafts (14, 15) have axes of rotation (42, 43), and a distance between the axis of rotation of the first jackshaft (14) and an axis of rotation of the input shaft (3) is substantially equal to a distance between the axis of rotation of the second jackshaft (15) and the axis of rotation of the input shaft (3).

5. The double clutch transmission according to claim 2, wherein the smallest fixed gear (27) of the concentric intermediate shaft (5) used for the reverse simple transmission gear stage (R) is also in engagement with the second largest rotatable gear (16) which is on the first jackshaft (14) forming the transmission gear structure for a first simple transmission gear stage (9).

6. The double clutch transmission according to claim 5, wherein the concentric intermediate shaft (5) is provided with at least two simple transmission gear stages (10, 11) of subsequent even-numbered gears (IV and VI gear).

7. The double clutch transmission according to claim 5, wherein each of the fixed gears (27, 24, 22) of the concentric intermediate shaft (5) is part of the first, a second and a third simple transmission gear stages (9, 10, 11) of the concentric intermediate shaft (5), the second largest rotatable gear (16) of the first jackshaft (14) used for forming a second lowest forward gear (II-gear) and an output gear (23) of the third simple transmission gear stage (11) are rotatably supported on the first jackshaft (14), an intermediate output gear (25) of the second simple transmission gear stage (10) disposed axially between the smallest fixed gear (27) of the first simple transmission gear stage (9) and the third simple transmission gear stage (11) is rotatably supported on the second jackshaft (15), and a first gear change clutch (26) is arranged between the second largest rotatable gear (16) and the output gear (23) which are rotatably supported on the first jackshaft (14) for selectively coupling the second largest rotatable gear (16) and the output gear (23) with the first jackshaft (14).

8. The double clutch transmission according to claim 7, wherein the first gear change clutch (26) is between the second largest rotatable gear (16) of the first jackshaft (14) and the third simple transmission gear stage (11).

9. The double clutch transmission according to claim 7, further comprising:
a second gear change clutch (28) disposed on the second jackshaft (15) between the reversing output gear (20) and the intermediate output gear (25) of the second simple transmission gear stage (10), the second gear change clutch (28) being capable for selectively coupling the reversing output gear (20) and the intermediate output gear (25) of the second simple transmission gear stage (10) to the second jackshaft (15).

10. The double clutch transmission according to claim 9, wherein the second gear change clutch (28) and the first simple transmission gear stage (9) are disposed in the same plane.

11. The double clutch transmission according to claim 10, wherein the second load clutch (K2) is connected to one end of the concentric intermediate shaft (5) and the smallest fixed gear (27) of the concentric intermediate shaft (5) is connected to an opposite end of the concentric intermediate shaft (5), and the third simple transmission gear stage (11) associated with the concentric intermediate shaft (5) forms a transmission gear structure for a highest even numbered gear (VI gear), which is arranged axially closest to the second load clutch (K2).

12. The double clutch transmission according to claim 11, wherein a fourth simple transmission gear stage includes the smallest gear (30) on the central intermediate shaft (4) meshed with the largest rotatable gear (31) of the first jackshaft (14).

13. The double clutch transmission according to claim 12, wherein a third gear change clutch (36) is disposed on the first jackshaft (14) between the largest rotatable gear (31) of the fourth simple transmission gear stage (6) of the first jackshaft (14) and the end output gear (34) of a sixth simple transmission gear stage (8) at an end of the first jackshaft (14) for selectively coupling the largest rotatable gear (31) of the fourth simple transmission gear stage (6) and the end output gear (34) of the sixth simple transmission gear stage (8) with the first jackshaft (14).

14. The double clutch transmission according to claim 12, wherein the fifth simple transmission gear stage includes an intermediate fixed gear (37) of the central intermediate shaft (4) meshed with a rotatable output gear (38) on the second jackshaft (15), the sixth simple transmission gear stage includes the jackshaft end output gear (35) on the second jackshaft (15) meshed with the largest fixed gear (33) on the central intermediate shaft (4), and a fourth gear change clutch (40) is arranged between the rotatable output gear (38) of the fifth simple transmission gear stage and the jackshaft end output gear (35) of the sixth simple transmission gear stage.

15. The double clutch transmission according to claim 14, wherein the fifth simple transmission gear stage (7) of the central intermediate shaft (4) is disposed axially between the fourth simple transmission gear stage (6) and the sixth simple transmission gear stage (8) of the central intermediate shaft (4), which is a double gear stage.

16. The double clutch transmission according to claim 15, wherein the third and fourth gear change clutches (36, 40) are disposed in a common plane (39—39).

17. The double clutch transmission according to claim 16, wherein the fourth simple transmission gear stage (6) is a lowest forward gear (I-gear).

18. The double clutch transmission according to claim 17, wherein the fifth simple transmission gear stage (7) is a third forward gear (Ill-gear).

19. The double clutch transmission according to claim 18, wherein the end output gear (34) of the sixth simple transmission gear stage (8) disposed on the first jackshaft (14) is used for forming a fifth forward gear (V-gear).

20. The double clutch transmission according to claim 18, wherein the jackshaft end output gear (35) of the sixth simple transmission gear stage (8) disposed on the second jackshaft (15) is used for forming the gear structure for a seventh gear (VII-gear).

21. The double clutch transmission according to claim 20, wherein the first and second jackshaft (14, 15) have axes of rotation (42, 43), which are arranged at different distances from an axis (41) of the input shaft (3).

22. The double clutch transmission according to claim 21, wherein the axis of rotation (42) of the first jackshaft (14) has a larger distance from the axis of rotation (41) of the input shaft (3) than the axis of rotation (43) of the second jackshaft (15).

* * * * *